(12) United States Patent
Cobb et al.

(10) Patent No.: US 11,939,772 B2
(45) Date of Patent: Mar. 26, 2024

(54) ROOFING INSULATION STRUCTURE AND ROOF INSULATION SYSTEM

(71) Applicant: Roof Asset Management USA, Ltd., Brunswick, OH (US)

(72) Inventors: Joseph C. Cobb, Medina, OH (US); Katina Cobb, Medina, OH (US)

(73) Assignee: Roof Asset Management USA, Ltd., Brunswick, OH (US)

( * ) Notice: Subject to any disclaimer, the term of this patent is extended or adjusted under 35 U.S.C. 154(b) by 431 days.

(21) Appl. No.: 17/286,705

(22) PCT Filed: Oct. 22, 2019

(86) PCT No.: PCT/US2019/057336
§ 371 (c)(1),
(2) Date: Apr. 19, 2021

(87) PCT Pub. No.: WO2020/086517
PCT Pub. Date: Apr. 30, 2020

(65) Prior Publication Data
US 2021/0372130 A1 Dec. 2, 2021

Related U.S. Application Data

(60) Provisional application No. 62/751,376, filed on Oct. 26, 2018.

(51) Int. Cl.
*E04D 13/17* (2006.01)
*B32B 5/02* (2006.01)
(Continued)

(52) U.S. Cl.
CPC .............. *E04D 13/172* (2013.01); *B32B 5/02* (2013.01); *B32B 5/18* (2013.01); *B32B 21/06* (2013.01);
(Continued)

(58) Field of Classification Search
CPC ....... E04D 13/172; E04D 13/17; E04D 11/02; E04B 1/80
See application file for complete search history.

(56) References Cited

U.S. PATENT DOCUMENTS 7,001,266 B2  2/2006  Jones et al.
7,841,137 B2 * 11/2010  Rosten .................. E04D 13/152
                                                      52/302.1

(Continued)

FOREIGN PATENT DOCUMENTS

JP      07-018800 A     1/1995
JP      2005-256370 A   9/2005
WO      2009-140422 A1  11/2009

*Primary Examiner* — Rodney Mintz
(74) *Attorney, Agent, or Firm* — Sisson & Banyas, Attorneys at Law, LLC; Jeffrey J. Banyas

(57) ABSTRACT

It is described herein a roofing insulation structure. The roofing insulation structure may comprise a first exterior surface and a second exterior surface opposite the first exterior surface. The first exterior surface may comprise a channeled profile having a plurality of channels. Each channel of the plurality of channels may have a depth of at least 1 mm, a width of at least 0.15 mm, and a ratio of depth to width in a range of between 1.01:1 and 7:1. It is also described herein a roofing insulation system comprising a plurality of the roofing insulation structures. It is also disclosed herein a method of manufacturing the roofing insulation structures. It is also disclosed herein a method of installing the roofing insulation system.

11 Claims, 7 Drawing Sheets

(51) Int. Cl.
| | |
|---|---|
| *B32B 5/18* | (2006.01) |
| *B32B 21/06* | (2006.01) |
| *B32B 29/00* | (2006.01) |
| *B32B 29/02* | (2006.01) |
| *E04B 1/80* | (2006.01) |
| *E04D 11/02* | (2006.01) |

(52) U.S. Cl.
CPC ............ *B32B 29/007* (2013.01); *B32B 29/02* (2013.01); *E04B 1/80* (2013.01); *E04D 11/02* (2013.01); *B32B 2262/067* (2013.01); *B32B 2262/101* (2013.01); *B32B 2266/0278* (2013.01); *B32B 2266/06* (2013.01); *B32B 2266/08* (2013.01); *B32B 2307/304* (2013.01); *B32B 2419/06* (2013.01)

(56) References Cited

U.S. PATENT DOCUMENTS

| | | | |
|---|---|---|---|
| 7,861,467 B2* | 1/2011 | Rosten | E04D 13/178 |
| | | | 52/95 |
| 2003/0126806 A1 | 7/2003 | Ellis | |
| 2004/0235411 A1* | 11/2004 | Jones | E04D 5/14 |
| | | | 454/367 |
| 2008/0209822 A1 | 9/2008 | Rosten et al. | |
| 2008/0216419 A1* | 9/2008 | Rosten | E04D 13/152 |
| | | | 454/366 |
| 2019/0345713 A1* | 11/2019 | Lolley | E04B 1/80 |
| 2022/0205254 A1* | 6/2022 | McDow, Jr. | E04F 17/04 |

\* cited by examiner

ROOFING INSULATION STRUCTURE AND ROOF INSULATION SYSTEM

CROSS REFERENCES AND PRIORITIES

This Application claims priority from International Application No. PCT/US2019/057336 filed on 22 Oct. 2019 and United States Provisional Application No. 62/751,376 filed on 26 Oct. 2018 the teachings of each of which are incorporated by reference herein in their entirety.

BACKGROUND

Membrane roof systems are commonly used in low-slope roofs. A membrane roof typically comprises a rubber or plastic (e.g., made of PVC) sheet that provides a moisture and vapor barrier. Membrane roofs are relatively inexpensive to install and consequently the use of membrane roof systems has been expanding in recent years.

One problem with membrane roofs is that they are susceptible to damage from high winds. High winds create a reduced air pressure on the top surface of the membrane, which causes it to lift from the building. A membrane roof lifted from the subroof can be torn from the building or damaged in other ways.

One of the challenges of designing membrane roof systems is providing an attachment method strong enough to prevent uplift of the membrane during high wind conditions. Conventional methods for attachment include mechanical fasteners, adhesive layers, or ballast. These methods have a tendency to increase the heat transmission through the roof, which increases heating and cooling costs. Also, these methods are not completely reliable in very high winds.

Alternative methods for fastening membrane roofs include a turbine vent system (made by Burke Industries of San Jose, California, U.S.A.) and a passive vent (made by the 2001 Company of Waterbury, Connecticut, U.S.A.). These vent systems provide reduced air pressure under the membrane to hold it in place. However, both these solutions require air-tight deck assemblies for efficient operation and have a relatively high manufacturing cost.

Another solution is proposed in U.S. Pat. No. 7,001,266 which provides "a roof vent and roof system that reduces air pressure under a membrane roof when wind blows, thereby holding down the membrane roof. The present roof vent employs the Venturi effect to reduce the pressure under the membrane." The roof vent solution proposed in U.S. Pat. No. 7,001,266 is a separate component attached to the membrane roof requiring additional material and installation costs.

The need exists, therefore, for an apparatus and system for membrane roofs which resists uplift in high wind conditions without the need for added components attached to the roof or an air-tight deck assembly, and which also reduce heat transmission through the roof.

SUMMARY

A roofing insulation structure is disclosed. The roofing insulation structure may comprise a first exterior surface comprising a channeled profile having a plurality of channels having a depth of at least 1 mm (0.04 in.), a width of at least 0.15 mm (0.006 in.), and a ratio of depth to width in a range of between 1.01:1 and 7:1. The roofing insulation structure may further comprise a second exterior surface opposite the first exterior surface. The roofing insulation structure may be capable of being installed on a roof of a building with the first exterior surface oriented to face an exterior of the building and the second exterior surface oriented to face an interior of the building.

In some embodiments, the plurality of channels may include at least one primary channel and at least one secondary channel in fluid communication with the at least one primary channel. In other embodiments, the plurality of channels may include at least one primary channel and not include a secondary channel in fluid communication with the at least one primary channel.

In some embodiments, each channel of the plurality of channels has a cross-sectional profile selected from the group consisting of a "V" shape, a "U" shape, and combinations thereof. In other embodiments, each channel of the plurality of channels has a cross-sectional profile selected from the group consisting of a square shape, a rectangular shape, a heptagonal shape, a hexagonal shape, an octagonal shape, and combinations thereof.

In some embodiments, each channel of the plurality of channels may have a depth of at least 0.75 mm (0.03 in.). In other embodiments, each channel of the plurality of channels may have a depth of at least 0.5 mm (0.02 in.). In still other embodiments, each channel of the plurality of channels may have a depth of at least 0.25 mm (0.010 in.).

In some embodiments, each channel of the plurality of channels may have a width of at least 0.10 mm (0.004 in.). In other embodiments, each channel of the plurality of channels may have a width of at least 0.05 mm (0.002 in.). In still other embodiments, each channel of the plurality of channels may have a width of at least 0.01 mm (0.0004 in.).

In some embodiments, each channel of the plurality of channels may have a ratio of depth to width in a range of between 1.01:1 and 5:1. In other embodiments, each channel of the plurality of channels may have a ratio of depth to width in a range of between 1.01:1 and 3:1. In still other embodiments, each channel of the plurality of channels may have a ratio of depth to width in a range of between 1.01:1 and 2:1.

In some embodiments, the roofing insulation structure may comprise a first layer corresponding to the first exterior surface, a second layer corresponding to the second exterior surface, and a third layer located between the first layer and the second layer. The first layer and the second layer may each independently comprise a material selected from the group consisting of paper and cardboard. The third layer may comprise an insulating material selected from the group consisting of closed cell foamed polyurethane, open cell foamed polyurethane, closed cell polyisocyanurate, open cell polyisocyanurate, fiberglass, peralite, wood, and wood fiber.

A roofing insulation system is also disclosed. The roofing insulation system may comprise at least a first roofing insulation structure and a second roofing insulation structure. A first edge of the first roofing insulation structure may be connected to a third edge of the second roofing insulation structure. An exterior roofing layer may cover a top surface of the roofing insulation system. The first roofing insulation structure and second roofing insulation structure may be of the type disclosed herein.

In some embodiments of the roofing insulation system the first roofing insulation structure may comprise at least one first primary channel and no secondary channels in fluid communication with the at least one first primary channel. Also, the second roofing insulation structure may comprise at least one second primary channel and no secondary channels in fluid communication with the at least one second primary channel. At least one first primary channel of the first roofing insulation structure may be in fluid communication with a second primary channel of the second roofing insulation structure.

In some embodiments, the first roofing insulation structure may comprise at least one first primary channel and at least one first secondary channel in fluid communication with the at least one first primary channel. Also, the second roofing insulation structure may comprise at least one second primary channel and at least one second secondary channel in fluid communication with the at least one second primary channel. At least one first primary channel of the first roofing insulation structure may be in fluid communication with a second primary channel of the second roofing insulation structure. At least one first secondary channel of the first roofing insulation structure may be in fluid communication with a second secondary channel of the second roofing insulation structure.

A method of manufacturing a roofing insulation structure is also disclosed. The method may comprise the steps of producing a roofing insulation structure blank, and debossing at least one primary channel into the roofing insulation structure blank. The at least one primary channel may be debossed into the roofing insulation structure blank by a method selected from the group consisting of engraving, embossing, or overlaying a cover layer which already comprises the at least one primary channel.

In some embodiments of the method of manufacturing a roofing insulation structure, the method further may further comprise debossing at least one secondary channel into the roofing insulation structure blank. The at least one secondary channel may be debossed into the roofing insulation structure blank by a method selected from the group consisting of engraving, embossing, or overlaying a cover layer which already comprises the at least one secondary channel.

A method of installing a roofing insulation system onto a building is also disclosed. The method may comprise the steps of installing a subroof on the building, covering a first portion of an exterior surface of the subroof with a first roofing insulation structure with the first exterior surface oriented to face the exterior of the building, and covering a second portion of the exterior surface of the subroof with the second roofing insulation structure with at least one first primary channel of the first roofing insulation structure in fluid communication with a second primary channel of the second roofing insulation structure and optionally at least one first secondary channel of the first roofing insulation structure in fluid communication with a second secondary channel of the second roofing insulation structure, and repeating the covering step with a plurality of subsequent roofing insulation structures until at least 90% of a surface area of the exterior surface of the subroof is covered by the roofing insulation system wherein at least one primary channel of each subsequent roofing insulation structure is in fluid communication with a primary channel of another roofing insulation structure selected from the group consisting of a first primary channel of the first roofing insulation structure, a second primary channel of the second roofing insulation structure, and a primary channel of another subsequent roofing insulation structure, and optionally at least one secondary channel of each subsequent roofing insulation structure is in fluid communication with a secondary channel of another roofing insulation structure selected from the group consisting of a first secondary channel of the first roofing insulation structure, a second secondary channel of the second roofing insulation structure, and a secondary channel of another subsequent roofing insulation structure.

DETAILED DESCRIPTION

Disclosed herein is a roofing insulation structure, a roofing insulation system, a method of manufacturing the roofing insulation structure, and a method of installing the roofing insulation system. The roofing insulation structure, roofing insulation system, method of manufacturing the roofing insulation structure, and method of installing the roofing insulation system are described below with reference to the Figures. As described herein and in the claims, the following numbers refer to the following structures as noted in the Figures.

10 refers to a roof.
20 refers to a subroof.
30 refers to an exterior roofing layer.
40 refers to a wall
50 refers to an exterior of a building.
60 refers to an interior of a building.
70 refers to a roofing insulation layer.
100 refers to a roofing insulation structure.
110 refers to a first exterior surface of a roofing insulation structure.
120 refers to a second exterior surface of a roofing insulation structure.
130 refers to a roofing insulation structure interior layer.
140 refers to a first edge of a roofing insulation structure.
150 refers to a second edge of a roofing insulation structure.
160 refers to a third edge of a roofing insulation structure.
170 refers to a fourth edge of a roofing insulation structure.
200 refers to a channeled profile.
210 refers to a plurality of channels.
212 refers to a primary channel.
214 refers to a secondary channel.
220 refers to a depth of a channel.
230 refers to a width of a channel.
300 refers to a roofing insulation system.
310 refers to a first roofing insulation structure of a roofing insulation system.
311 refers to a first edge of a first roofing insulation structure.
312 refers to a second edge of a first roofing insulation structure.
313 refers to a third edge of a first roofing insulation structure.

314 refers to a fourth edge of a first roofing insulation structure.
316 refers to a first primary channel of a first roofing insulation structure.
318 refers to a first secondary channel of a first roofing insulation structure.
320 refers to a second roofing insulation structure.
321 refers to a first edge of a second roofing insulation structure.
322 refers to a second edge of a second roofing insulation structure.
323 refers to a third edge of a second roofing insulation structure.
324 refers to a fourth edge of a second roofing insulation structure.
326 refers to a second primary channel of a second roofing insulation structure.
328 refers to a second secondary channel of a second roofing insulation structure.
330 refers to a point of air ingress.
340 refers to a point of air egress.

Figure 1:
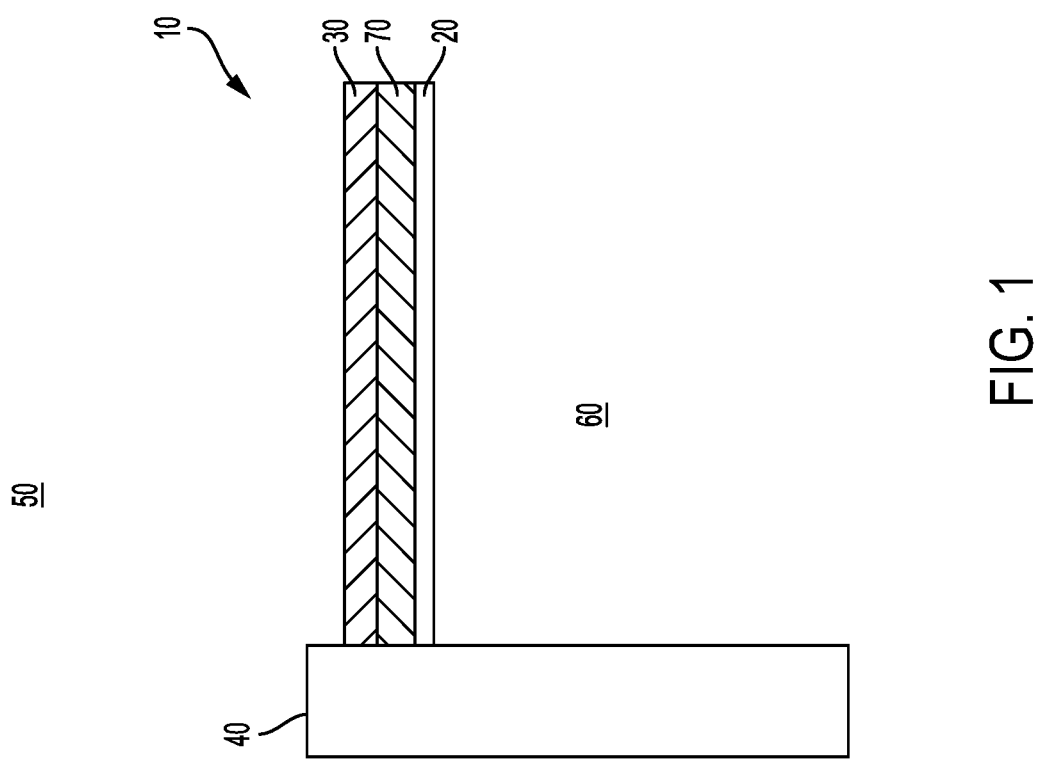
FIG. 1 is a partial cross section of a portion of a building showing a roofing insulation system.

FIG. 1 depicts a partial cross section of a building having a roof (10) and at least one wall (40). The roof and the walls define an interior (60) of the building which is separated from an exterior (50) of the building by at least the roof and the walls. As shown in FIG. 1 the roof may comprise a subroof (20) located proximate to the interior of the building, an exterior roofing layer (30) located proximate to the exterior of the building, and a roofing insulation layer (70) located between the subroof and the exterior roofing layer.

By exterior roofing layer (30) it is meant that the material is disposed between the exterior (50) of the building and the roofing insulation layer (70) with a bottom surface of the exterior roofing layer in contact with a top surface of the roofing insulation layer. However, it is not necessarily so that the exterior roofing layer is directly exposed to atmosphere from the exterior of the building. In some embodiments, there may be additional roofing layers disposed between the exterior roofing layer and the exterior of the building.

The exterior roofing layer (30) is commonly known as the membrane layer, which may comprise one or more membrane materials. Common—non-limiting—examples of membrane materials include rubber, plastic sheet (commonly PVC), bitumen, and composite materials such as fiberglass or carbon fiber composite. The subroof (20) may also be referred to as the structural layer, which may comprise one or more structural materials. Common—non-limiting—examples of structural materials include oriented strand board (OSB), plywood, gypsum, steel, and drywall.

Figure 2:
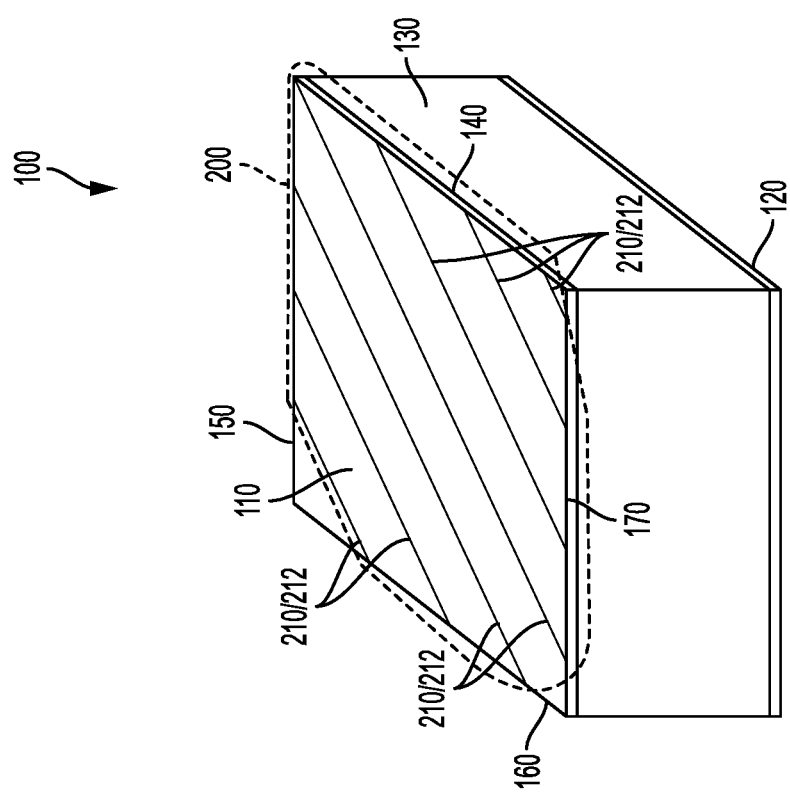
FIG. 2 is a perspective view of an embodiment of a roofing insulation structure for a roofing insulation system.

The roofing insulation layer (70) may comprise a plurality of roofing insulation structures (100). FIG. 2 depicts a perspective view of one embodiment of a roofing insulation structure (100). As shown in FIG. 2, the roofing insulation structure may comprise a first exterior surface (110) and a second exterior surface (120) opposite the first exterior surface with a roofing insulation structure interior layer (130) disposed between the first exterior surface and the second exterior surface. When installed on a roof of a building, the first exterior surface may be oriented to face the exterior (50 in FIG. 1) of the building while the second exterior surface may be oriented to face the interior (60 in FIG. 1) of the building.

While the embodiment shown in FIG. 2 depicts a roofing insulation structure (100) having three layers (a first exterior surface (110), a second exterior surface (120), and a roofing insulation structure interior layer (130)), embodiments may exist having only one or two of these layers. For instance, embodiments may exist having a single layer corresponding to the roofing insulation structure interior layer. Other embodiments may exist having a single layer corresponding to one of the first exterior surface or the second exterior surface. Still other embodiments may exist having two layers with one layer corresponding to the roofing insulation structure interior layer and a second layer corresponding to the first exterior surface or the second exterior surface. Other embodiments may exist comprising more than three layers. In practice, the number and type of layers is not limited and will be dictated by a number of factors including the size and shape of the roof, and the desired insulation properties.

The roofing insulation structure may be provided in a variety of shapes including circles, ovals, and polygons including triangles, squares, rectangles, heptagons, hexagons, octagons, and the like and mixtures of curves and lines. The insulation is generally provided to the construction site in square or rectangular form and then cut to fit the contours of the wall surrounding the roof and structures poking through the roof. The preferred shape is a square or a rectangle. As depicted in FIG. 2, the roofing insulation is in the shape of a square having a first edge (140), a second edge (150), a third edge (160), and a fourth edge (170).

In the embodiment shown in FIG. 2, the roofing insulation structure comprises three layers. The first exterior surface (110) and the second exterior surface (120) are each a separate layer—and are commonly referred to as a backing layers. The roofing insulation structure interior layer (130) is disposed between the layers corresponding to the first exterior surface and the second exterior surface. The first exterior surface (110) and/or the second exterior surface (120) in the FIG. 2 embodiment may be made of a material selected from the group consisting of paper or cardboard.

The roofing insulation structure interior layer (130) may be made of any type of insulating material. Common—non-limiting—examples of insulating materials may be selected from the group consisting of foamed polyurethane, foamed polyisocyanurate, fiberglass, pearlite, wood, and wood fiber. When the insulating material is of a foamed variety—the foam may come in a closed cell or open cell variety. Preferably, the roofing insulation structure interior layer will be made of foamed polyisocyanurate. When used, the foamed polyisocyanurate is preferably of a closed cell variety, however it may also be an open cell variety.

As shown in FIG. 2, the first exterior surface (110) further comprises a channeled profile (200) comprising a plurality of channels (210). The plurality of channels may consist of at least one primary channel (212) and—optionally—at least one secondary channel. Each channel within a single roofing insulation structure will have two end points. A channel may be defined as primary or secondary based on its two end points. A channel having two end points, both of which are located at an edge of the individual roofing insulation structure is known as a primary channel. A channel having two end points, at least one of which is located at a point along another channel (either a primary channel or another secondary channel) is known as a secondary channel.

As shown in the embodiment of FIG. 2, the channeled profile comprises a plurality of primary channels (212) extending diagonally along the first exterior surface. In this embodiment, the channeled profile does not include any secondary channels in fluid communication with any of the primary channels. In other words, in embodiments with only primary channels, none of the channels of the plurality of channels intersects with another channel within the same roofing insulation structure. By fluid communication it is meant that a fluid (typically atmospheric air from the exterior of the building) can pass through the channels when the roofing insulation structure is covered by an exterior roofing layer (30 in FIG. 1).

In embodiments having only primary channels and no secondary channels, neither the number nor the specific orientation of primary channels is considered important so long as none of the channels of the plurality of channels intersects with another channel within the same roofing insulation structure. For instance, the primary channels may be oriented diagonally along the first exterior surface as shown in FIG. 2, or the primary channels may be oriented horizontally or vertically along the first exterior surface. The number of primary channels may be an integer selected from the group consisting of between 1 and 1,000,000 per $ft^2$ of roofing insulation structure, between 1 and 100,000 per $ft^2$ of roofing insulation structure, between 1 and 10,000 per $ft^2$ of roofing insulation structure, between 1 and 1,000, between 1 and 500 per $ft^2$ of roofing insulation structure, between 1 and 100 per $ft^2$ of roofing insulation structure, and between 1 and 50 per $ft^2$ of roofing insulation structure.

Figure 3:
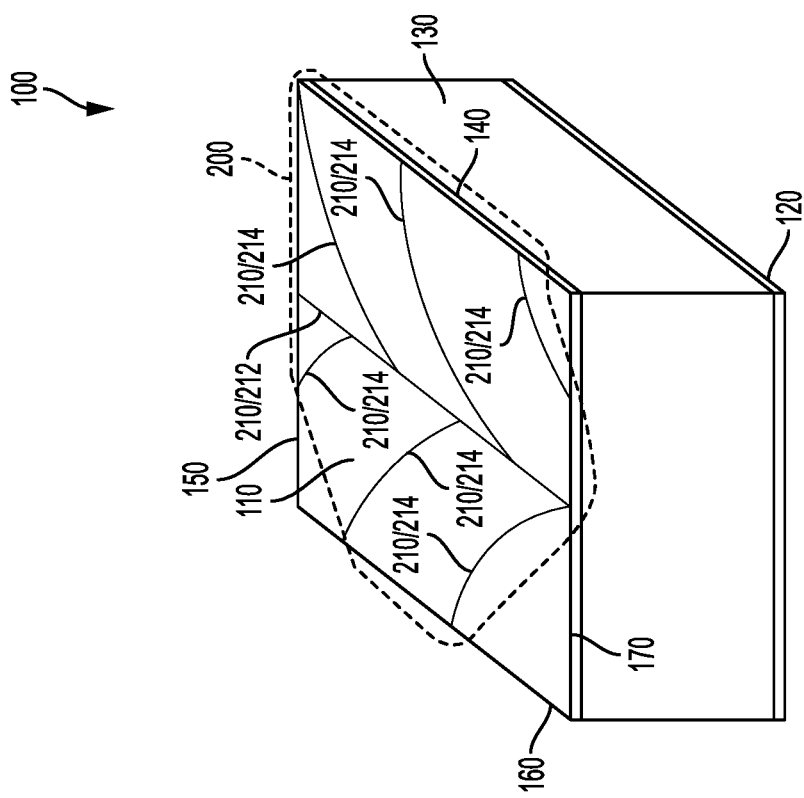
FIG. 3 is a perspective view of a separate embodiment of a roofing insulation structure for a roofing insulation system.

FIG. 3 depicts a perspective view of an alternative embodiment of a roofing insulation structure (100). Like the roofing insulation structure of FIG. 2, the roofing insulation structure of FIG. 3 may comprise a first exterior surface (110) and a second exterior surface (120) opposite the first exterior surface with a roofing insulation structure interior layer (130) disposed between the first exterior surface and the second exterior surface. When installed on a roof of a building, the first exterior surface may be oriented to face the exterior (50) of the building while the second exterior surface may be oriented to face the interior (60) of the building.

The first exterior surface (110) and/or the second exterior surface (120) may be made of a material selected from the group consisting of paper or cardboard.

The roofing insulation structure interior layer (130) may be made of a material selected from the group consisting of foamed polyurethane, foamed polyisocyanurate. Preferably, the roofing insulation structure interior layer will be made of foamed polyisocyanurate. When used, the foamed polyisocyanurate is preferably of a closed cell variety, however it may also be an open cell variety.

As shown in FIG. 3, the first exterior surface (110) further comprises a channeled profile (200) comprising a plurality of channels (210). The plurality of channels may consist of at least one primary channel (212) and—optionally—at least one secondary channel (214). As shown in the embodiment of FIG. 3, the channeled profile comprises a primary channel extending from a second edge of the roofing insulation structure (150) to a fourth edge of the roofing insulation structure (170) opposite the second edge. The embodiment shown in FIG. 3 also comprises a plurality of secondary channels (214), each of the secondary channels being in fluid communication with the primary channel. In other words, within each individual roofing insulation structure, at least one secondary channel intersects with at least one primary channel allowing for the passage of a fluid such as air from the secondary channel into the primary channel or vice versa. By fluid communication it is meant that a fluid (typically atmospheric air from the exterior of the building) can pass through the channels when the roofing insulation structure is covered by an exterior roofing layer (30 in FIGS. 4 and 5).

Some embodiments may also include at least one tertiary channel (not shown). When used, each of the tertiary channels may be in fluid communication with at least one secondary channel. In other words, within each individual roofing insulation structure, at least one tertiary channel intersects with at least one secondary channel allowing for the passage of a fluid such as air from the tertiary channel into the secondary channel or vice versa. By fluid communication it is meant that a fluid (typically atmospheric air from the exterior of the building) can pass through the channels when the roofing insulation structure is covered by an exterior roofing layer.

Some embodiments may also include at least one quaternary channel (not shown). When used, each of the quaternary channels may be in fluid communication with at least one tertiary channel. In other words, within each individual roofing insulation structure, at least one quaternary channel intersects with at least one tertiary channel allowing for the passage of a fluid such as air from the quaternary channel into the tertiary channel or vice versa. By fluid communication it is meant that a fluid (typically atmospheric air from the exterior of the building) can pass through the channels when the roofing insulation structure is covered by an exterior roofing layer.

Neither the number nor the specific orientation of primary channels and secondary channels in embodiments having secondary channels is considered important so long as at least one secondary channel is in fluid communication with at least one primary channel within the same roofing insulation structure. The number of primary channels may be an integer selected from the group consisting of between 1 and 1,000,000 per $ft^2$ of roofing insulation structure, between 1 and 100,000 per $ft^2$ of roofing insulation structure, between 1 and 10,000 per $ft^2$ of roofing insulation structure, between 1 and 1,000 per $ft^2$ of roofing insulation structure, between 1 and 500 per $ft^2$ of roofing insulation structure, between 1 and 100 per $ft^2$ of roofing insulation structure, and between 1 and 50 per $ft^2$ of roofing insulation structure. Similarly, the number of secondary channels may be an integer selected from the group consisting of between 1 and 1,000,000 per $ft^2$ of roofing insulation structure, between 1 and 100,000 per $ft^2$ of roofing insulation structure, between 1 and 10,000 per $ft^2$ of roofing insulation structure, between 1 and 1,000 per $ft^2$ of roofing insulation structure, between 1 and 500 per $ft^2$ of roofing insulation structure, between 1 and 100 per $ft^2$ of roofing insulation structure, and between 1 and 50 per $ft^2$ of roofing insulation structure.

In embodiments having tertiary and quaternary channels, neither the number nor the specific orientation of tertiary and/or quaternary channels is considered important so long as at least one tertiary channel is in fluid communication with at least one secondary channel within the same roofing insulation structure (and in embodiments having quaternary channels at least one quaternary channel is in fluid communication with at least one tertiary channel within the same roofing insulation structure). The number of tertiary channels may be an integer selected from the group consisting of between 1 and 1,000,000 per $ft^2$ of roofing insulation structure, between 1 and 100,000 per $ft^2$ of roofing insulation structure, between 1 and 10,000 per $ft^2$ of roofing insulation structure, between 1 and 1,000 per $ft^2$ of roofing insulation structure, between 1 and 500 per $ft^2$ of roofing insulation structure, between 1 and 100 per $ft^2$ of roofing insulation structure, and between 1 and 50 per $ft^2$ of roofing insulation structure. Similarly, the number of quaternary channels may be an integer selected from the group consisting of between 1 and 1,000,000 per $ft^2$ of roofing insulation structure, between 1 and 100,000 per $ft^2$ of roofing insulation structure, between 1 and 10,000 per $ft^2$ of roofing insulation structure, between 1 and 1,000 per $ft^2$ of roofing insulation structure, between 1 and 500 per ft² of roofing insulation structure, between 1 and 100 per ft² of roofing insulation structure, and between 1 and 50 per ft² of roofing insulation structure.

In certain embodiments, one or more of the secondary channels may be in fluid communication with one or more other secondary channels within the same roofing insulation structure. In other words, within each individual roofing insulation structure, at least one secondary channel intersects with at least one other secondary channel allowing for the passage of a fluid such as air between the two secondary channels.

In other embodiments (not shown), there may be at least one primary channel which is not in fluid communication with one or more secondary channels and at least one other primary channel which is in fluid communication with one or more secondary channels.

Figure 4:
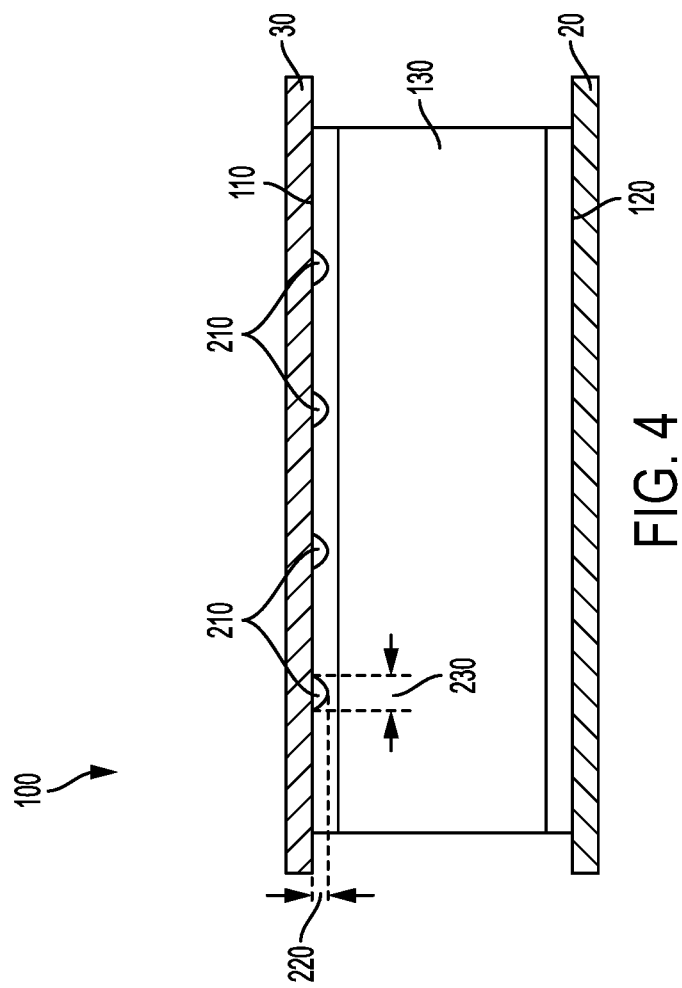
FIG. 4 is a side view of an embodiment of a roofing insulation structure for a roofing insulation system.
Figure 5:
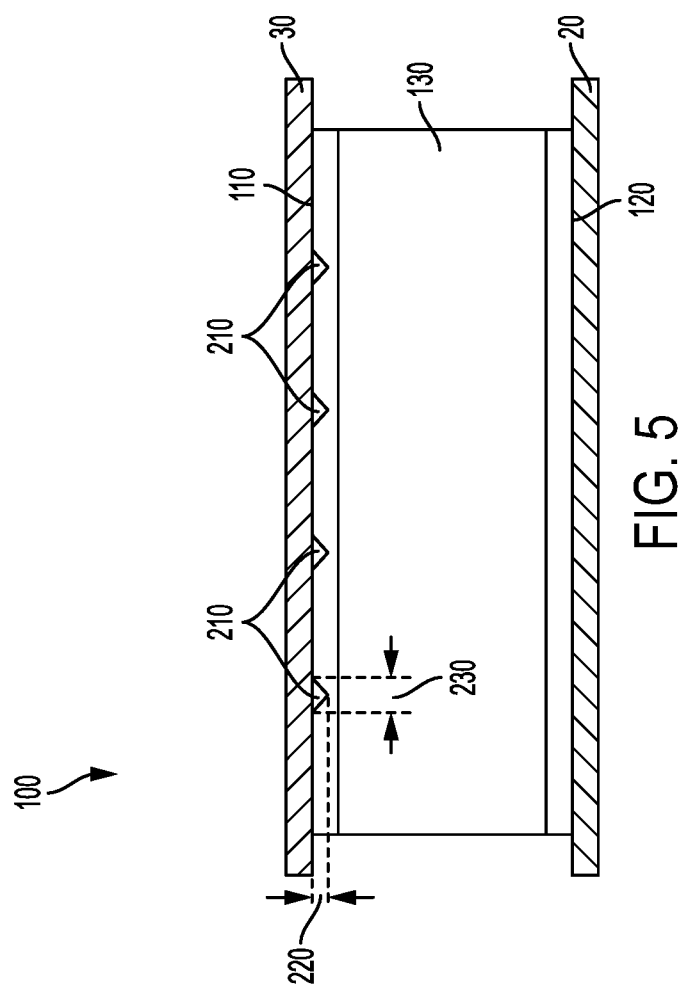
FIG. 5 is a side view of a separate embodiment of a roofing insulation structure for a roofing insulation system.

As shown in FIG. 4 and FIG. 5, each channel of the plurality of channels (210) will have a depth (220) and a width (230) when viewed in a cross section of the roofing insulation structure (100). The depth of any individual channel of the plurality of channels may be at least 1 mm (0.04 in.), at least 0.75 mm (0.03 in.), at least 0.5 mm (0.02 in.), or at least 0.25 mm (0.01 in.). The width of any individual channel of the plurality of channels may be at least 0.15 mm (0.006 in.), at least 0.10 mm (0.004 in.), at least 0.05 mm (0.002 in.), or at least 0.01 mm (0.0004 in.). It is not considered important that each individual channel (or each individual primary channel or each individual secondary channel) have the same depth or width.

The depth and width of any one individual channel (either a primary channel or a secondary channel) may also be described in terms of a ratio of depth to width. The ratio of depth to width may be in a range of between 1.01:1 and 7:1, between 1.01:1 and 5:1, between 1.01:1 and 3:1, and between 1.01:1 and 2:1. It is believed that, by maintaining the ratio of depth to width in these ranges, air from the interior or exterior of the building may actively flow into and through the channels creating a Bernulli effect beneath the exterior roofing layer which allows the exterior roofing layer to resist uplift without drawing a portion of the exterior roofing layer into the channel and blocking air flow through the channel.

Each individual channel of the plurality of channels may also have a cross-sectional profile. The specific shape of the cross-sectional profile may be selected from a "V" shape (as shown in FIG. 4), a "U" shape (as shown in FIG. 5), and combinations thereof. It is not considered important that each individual channel (or each individual primary channel or each individual secondary channel) of the plurality of channels within an individual roofing insulation structure have the same cross-sectional profile shape. In some embodiments, a first plurality of channels (primary channels, secondary channels, or both) in one individual roofing insulation structure may have a "V" shaped cross-sectional profile while a second plurality of channels (primary channels, secondary channels, or both) in the same individual roofing insulation structure may have a "U" shaped cross-sectional profile. Other cross-sectional profile shapes (not shown) may include a square shaped cross-sectional profile, a rectangular shaped cross-sectional profile, a heptagonal shaped cross-sectional profile, a hexagonal shaped cross-sectional profile, or an octagonal shaped cross-sectional profile.

Figure 6:
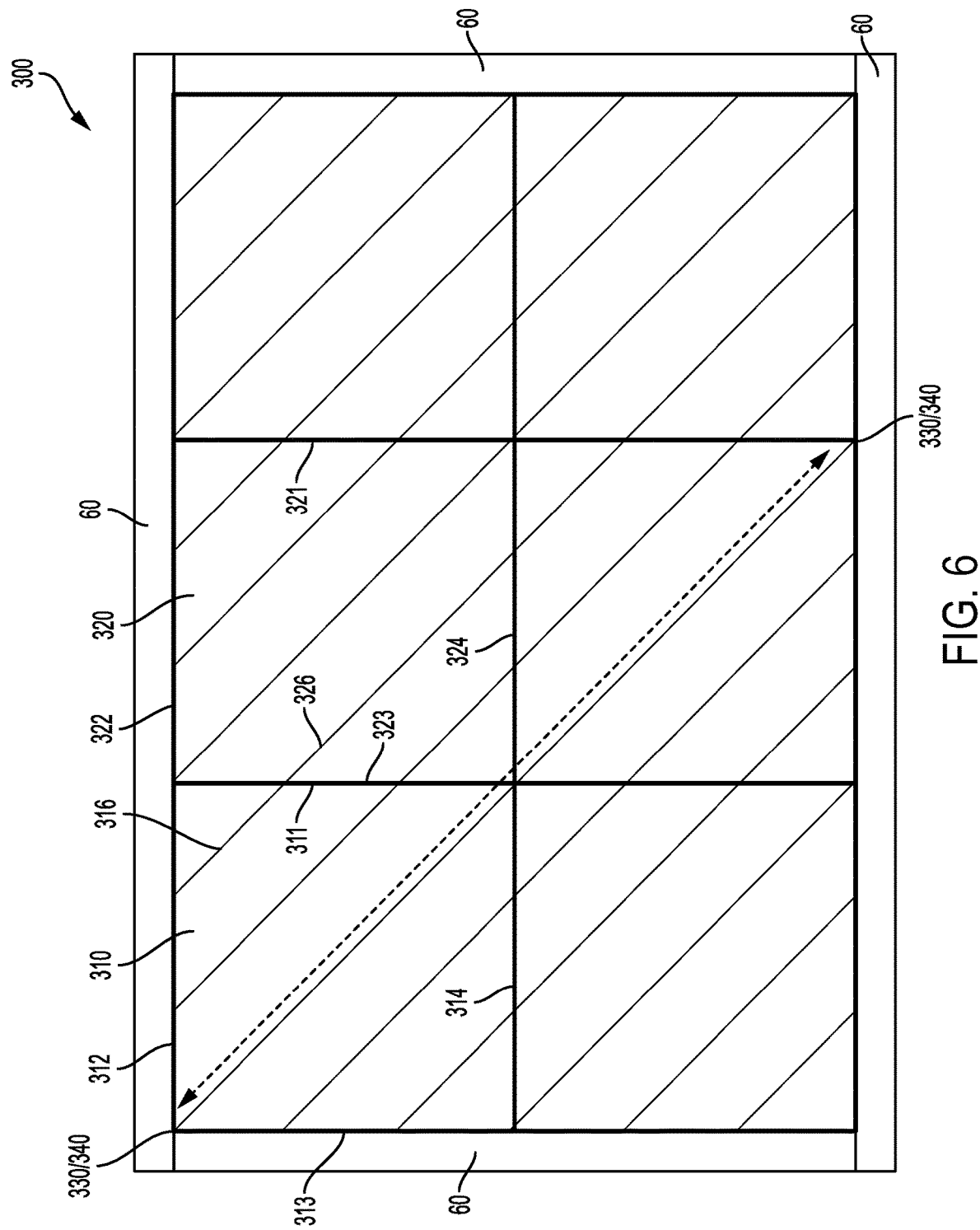
FIG. 6 is a top view of an embodiment of a portion of a roofing insulation system.
Figure 7:
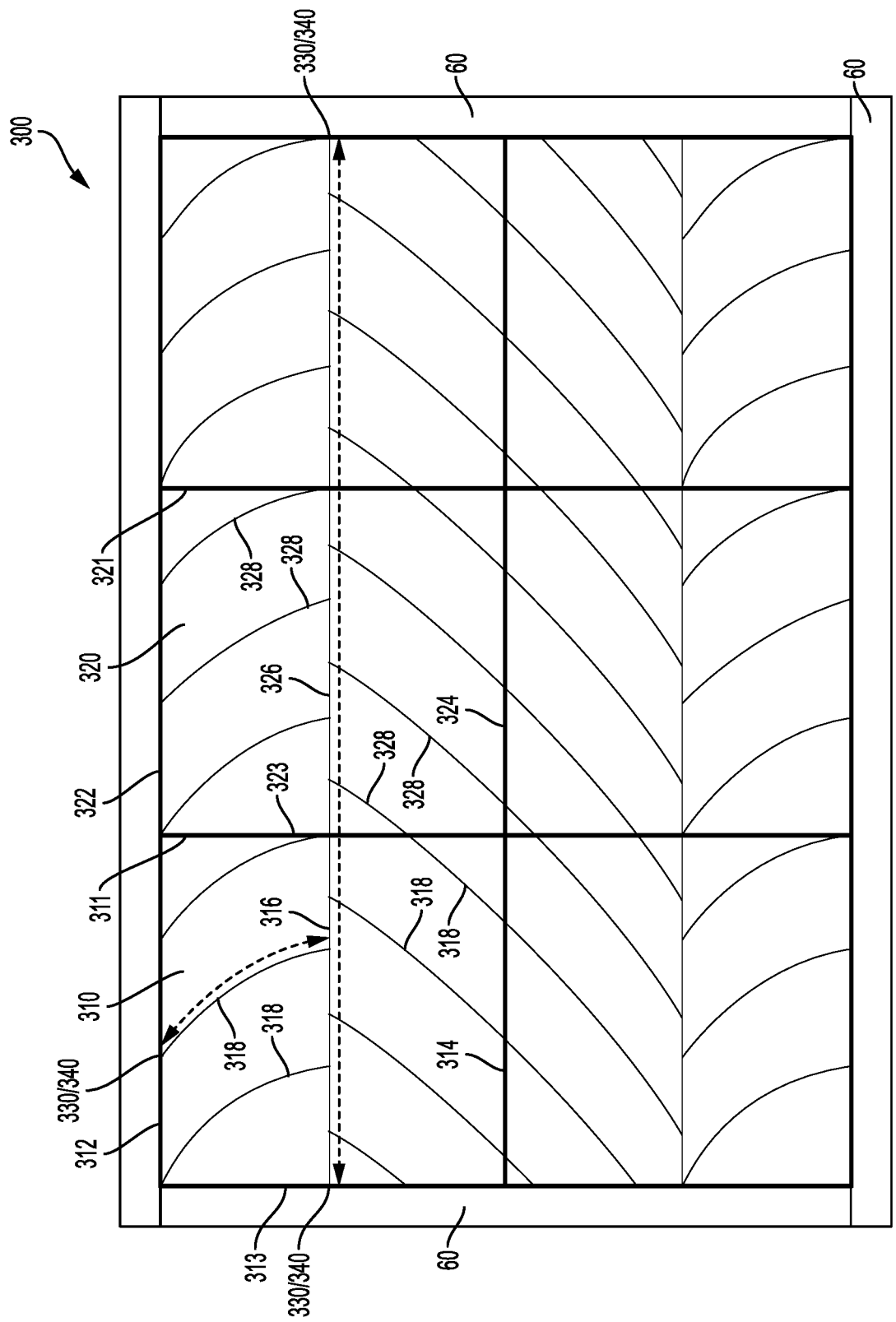
FIG. 7 is a top view of a separate embodiment of a portion of a roofing insulation system.

FIG. 6 and FIG. 7 depict two embodiments of a roofing insulation system (300). As shown in FIG. 6 and FIG. 7, the roofing insulation system may comprise at least a first roofing insulation structure (310) and a second roofing insulation structure (320). While the embodiments shown in FIG. 6 and FIG. 7 depict six individual roofing insulation structures, the number of individual roofing insulation structures is not considered important. In practice, the number of roofing insulation structures will be determined based on a number of factors including the size and shape of each individual roofing insulation structure as well as the size and shape of the individual roof upon which the roofing insulation system is installed.

FIG. 6 depicts a top view of an embodiment of a roofing insulation system (300) comprising six individual roofing insulation structures of the type shown in FIG. 2. As shown in FIG. 6, the roofing insulation system comprises at least a first roofing insulation structure (310) and a second roofing insulation structure (320). The first roofing insulation structure may comprise at least a first edge (311), a second edge (312), a third edge (313), and a fourth edge (314). Similarly, the second roofing insulation structure may comprise at least a first edge (321), a second edge (322), a third edge (323) and a fourth edge (324).

As shown in FIG. 6, the first edge (311) of the first roofing insulation structure may be connected to the third edge (323) of the second roofing insulation structure. The roofing insulation structures in the embodiment of a roof insulation system disclosed in FIG. 6 have only primary channels. That is, there are no secondary channels in fluid communication with a primary channel in any of the roofing insulation structures of the roofing insulation system depicted in FIG. 6. As shown, the first roofing insulation structure (310) comprises at least one first primary channel (316) and no secondary channels in fluid communication with the at least one first primary channel. Similarly, the second roofing insulation structure comprises at least one second primary channel (326) and no secondary channels in fluid communication with the at least one second primary channel.

At least one of the first primary channels of the first roofing insulation structure is in fluid communication with a second primary channel of the second roofing insulation structure. By maintaining the fluid communications between the various channels of the roofing insulation structures, it is believed that airflow (represented by the dashed line) entering at a point of ingress (330) through a wall (60) will pass from one roofing insulation structure to another and exit at a point of egress (340) through the wall, thereby maintaining a low pressure zone which will reduce uplift on the exterior roofing layer. The airflow may enter through the wall either at an opening in the wall, such as a vent, or by virtue of a natural porosity of the wall material which allows air to pass through the wall material. It should be understood that any one terminal end of a channel may serve as either a point of ingress or a point of egress. Whether a particular terminal end of a channel is a point of ingress or a point of egress will depend upon a number of factors including the directionality of wind around the building at a particular moment in time. For example, a terminal end of a channel located on the north edge of a roof may serve as a point of ingress when winds are blowing substantially from the north, while that same terminal end of a channel may serve as a point of egress when winds are blowing substantially from the south.

FIG. 7 depicts a top view of a separate embodiment of a roofing insulation system (300) comprising six individual roofing insulation structures of the type shown in FIG. 3. As shown in FIG. 7, the roofing insulation system comprises at least a first roofing insulation structure (310) and a second roofing insulation structure (320). The first roofing insulation structure may comprise at least a first edge (311), a second edge (312), a third edge (313), and a fourth edge (314). Similarly, the second roofing insulation structure may comprise at least a first edge (321), a second edge (322), a third edge (323), and a fourth edge (324).

As shown in FIG. 7, the first edge (311) of the first roofing insulation structure may be connected to the third edge (323) of the second roofing insulation structure. The roofing insulation structures in the embodiment of a roof insulation system disclosed in FIG. 7 have both primary channels and secondary channels. That is, there is at least one secondary channel in fluid communication with a primary channel on each of the roofing insulation structure of the roofing insulation system depicted in FIG. 7. As shown, the first roofing insulation structure (310) comprises at least one first primary channel (316) and at least one first secondary channel (318) in fluid communication with the at least one first primary channel. Similarly, the second roofing insulation structure comprises at least one second primary channel (326) and at least one second secondary channel (328) in fluid communication with the at least one second primary channel.

At least one of the first primary channels of the first roofing insulation structure is in fluid communication with a second primary channel of the second roofing insulation structure. Similarly, at least one first secondary channel of the first roofing insulation structure is in fluid communication with a second secondary channel of the second roofing insulation structure. By maintaining the fluid communications between the various channels of the roofing insulation structures, it is believed that airflow (represented by the dashed line) entering at a point of ingress (330) through a wall (60) will pass from one roofing insulation structure to another and exit at a point of egress (340) through the wall, thereby maintaining a low pressure zone which will reduce uplift on the exterior roofing layer. The airflow may enter through the wall either at an opening in the wall, such as a vent, or by virtue of a natural porosity of the wall material which allows air to pass through the wall material. It should be understood that any one terminal end of a channel may serve as either a point of ingress or a point of egress. Whether a particular terminal end of a channel is a point of ingress or a point of egress will depend upon a number of factors including the directionality of wind around the building at a particular moment in time. For example, a terminal end of a channel located on the north edge of a roof may serve as a point of ingress when winds are blowing substantially from the north, while that same terminal end of a channel may serve as a point of egress when winds are blowing substantially from the south.

While the orientation and alignment of the various channels in FIGS. 6 and 7 have been described in reference to the first roofing insulation structure and the second roofing insulation structure, one of ordinary skill will recognize that these orientations and alignments apply equally to each roofing insulation structure which makes up the roofing insulation system. Specifically, each roofing insulation structure of the roofing insulation system preferably has at least one primary channel which is in fluid communication with a primary channel of at least one adjacent roofing insulation structure. More preferably, each roofing insulation structure of the roofing insulation system preferably has at least one primary channel which is in fluid communication with a primary channel of at least one adjacent roofing insulation structure and has at least one secondary channel which is in fluid communication with a secondary channel of at least one adjacent roofing insulation structure.

In order to create the low pressure area beneath the exterior roofing layer, the channels in the roofing insulation system should include a point of air ingress (330) from outside of the building and a point of air egress (340) to the outside of the building which allows air to flow through the channel from the point of air ingress to the point of air egress. The channels should also be substantially free of or free of blockages or obstructions which would reduce or prevent the flow of air through the roofing insulation system. Any blockage or obstruction may create a high pressure zone which could create or enhance uplift on the exterior roofing layer.

While the roofing insulation structure and roofing insulation system have been described above with reference to the benefits in resisting uplift of the outer roofing layer during high wind conditions, the roofing insulation structure and system may provide additional benefits. For instance, air flow through the channels may also provide for improved cooling and increase the drying rate of any moisture that makes its way into the roofing insulation structure.

The method of manufacturing the roofing insulation structures may comprise two steps. First a roofing insulation structure blank which does not comprise any primary, secondary, tertiary, or quaternary channels is produced using prior art manufacturing techniques. Once produced, at least one primary channel is debossed into the roofing insulation structure blank. The at least one primary channel may be debossed by a method selected from the group consisting of engraving, embossing, or overlaying a cover layer of material which already comprises the channel(s). In some embodiments, at least one secondary channel is debossed into the roofing insulation structure blank. The at least one second channel may be debossed by a method selected from the group consisting of engraving, embossing, or overlaying a cover layer of material which already comprises the channel(s). The at least one secondary channel may be debossed prior to, after, or simultaneously with debossing the at least one primary channel. In some embodiments, at least one tertiary channel is debossed into the roofing insulation structure blank. The at least one tertiary channel may be debossed by a method selected from the group consisting of engraving, embossing, or overlaying a cover layer of material which already comprises the channel(s). The at least one tertiary channel may be debossed prior to, after, or simultaneously with debossing the at least one primary channel and/or the at least one secondary channel. In some embodiments, at least one quaternary channel is debossed into the roofing insulation structure blank. The at least one quaternary channel may be debossed by a method selected from the group consisting of engraving, embossing, or overlaying a cover layer of material which already comprises the channel(s). The at least one quaternary channel may be debossed prior to, after, or simultaneously with debossing the at least one primary channel and/or the at least one secondary channel and/or the at least one tertiary channel.

The method of installing the roofing system onto a building may begin by installing a subroof onto the building. The subroof may have an interior surface facing the interior of the building and an exterior surface facing the exterior of the building. Once the subroof is installed onto the building, the next step in installation may be to cover a first portion of the exterior surface of the subroof with a first roofing insulation structure with the first exterior surface of the first roofing insulation structure oriented to face the exterior of the building. The next step may be to cover a second portion of the exterior surface of the subroof with a second roofing insulation structure with the first exterior surface of the second roofing insulation structure oriented to face the exterior of the building. During this step, at least one first primary channel of the first roofing insulation structure may be aligned such that it is in fluid communication with a second primary channel of the second roofing insulation structure. In embodiments having secondary channels, this step may also involve aligning at least one first secondary channel of the first roofing insulation structure such that it is in fluid communication with a second secondary channel of the second roofing insulation structure.

This step may be repeated with a plurality of subsequent roofing insulation structures until a portion of the total surface area of the exterior surface of the subroof is covered by the roofing insulation system. The number of subsequent roofing insulation structures is not considered important, and will be dictated by a number of factors including the size and shape of each individual roofing insulation structure, and the size and shape of the roof. In practice, the portion of the total surface area of the exterior surface of the subroof which is covered by the roofing insulation system may be at least 50% of the total surface area of the exterior surface of the subroof with at least 60% being more preferred, at least 70% being even more preferred, at least 80% being still more preferred, and at least 90% being most preferred. At least one primary channel of each subsequent roofing insulation structure is preferably in fluid communication with a primary channel of another roofing insulation structure selected from the group consisting of a first primary channel of the first roofing insulation structure, a second primary channel of the second roofing insulation structure, and a primary channel of another subsequent roofing insulation structure. For embodiments having secondary channels, at least one secondary channel of each subsequent roofing insulation structure is preferably in fluid communication with a secondary channel of another roofing insulation structure selected from the group consisting of a first secondary channel of the first roofing insulation structure, a second secondary channel of the second roofing insulation structure, and a secondary channel of another subsequent roofing insulation structure.

What is claimed is:

1. A roofing insulation structure (100) comprising:
   a first exterior surface (110) comprising a channeled profile (200) having a plurality of ventilation channels (210) located therein having a ratio of depth (220) to width (230) in a range of between 1.01:1 and 7:1; and
   a second exterior surface (120) opposite the first exterior surface; and
   wherein the roofing insulation structure is installed on a low-slope roof (10) of a building with the first exterior surface oriented to face an exterior (50) of the building and the second exterior surface oriented to face an interior (60) of the building, and
   wherein the roofing insulation structure comprises a first layer corresponding to the first exterior surface, a second layer corresponding to the second exterior surface, and a third layer (130) located between the first layer and the second layer; wherein the first layer and the second layer each independently comprise a material selected from the group consisting of paper and cardboard; and wherein the third layer comprises an insulating material selected from the group consisting of foamed polyurethane, foamed polyisocyanurate, fiberglass, pearlite, wood, wood fiber, and combinations thereof.

2. The roofing insulation structure of claim 1, wherein the plurality of channels includes at least one primary channel (212) and at least one secondary channel (214) in fluid communication with the at least one primary channel.

3. The roofing insulation structure of claim 1, wherein the plurality of channels includes at least one primary channel and does not include a secondary channel in fluid communication with the at least one primary channel.

4. The roofing insulation structure of claim 1, wherein each channel of the plurality of channels has a cross-sectional profile selected from the group consisting of a "V" shape, a "U" shape, and combinations thereof.

5. The roofing insulation structure of claim 1, wherein each channel of the plurality of channels has a cross-sectional profile selected from the group consisting of a square shape, a rectangular shape, a heptagonal shape, a hexagonal shape, an octagonal shape, and combinations thereof.

6. The roofing insulation structure of claim 1, wherein each channel of the plurality of channels has a ratio of depth to width in a range of between 1.01:1 and 5:1.

7. The roofing insulation structure of claim 1, wherein each channel of the plurality of channels has a ratio of depth to width in a range of between 1.01:1 and 3:1.

8. The roofing insulation structure of claim 1, wherein each channel of the plurality of channels has a ratio of depth to width in a range of between 1.01:1 and 2:1.

9. A roofing insulation system (300) comprising at least a first roofing insulation structure (310) and a second roofing insulation structure (320) wherein a first edge of the first roofing insulation structure (311) is connected to a third edge of the second roofing insulation structure (323), an exterior roofing layer (30) covers a top surface of the roofing insulation system, and each of the first roofing insulation structure and the second roofing insulation structure are the roofing insulation structure of claim 1.

10. The roofing insulation system of claim 9, wherein the first roofing insulation structure comprises at least one first primary channel (316) and no secondary channels in fluid communication with the at least one first primary channel, the second roofing insulation structure comprises at least one second primary channel (326) and no secondary channels in fluid communication with the at least one second primary channel, and at least one first primary channel of the first roofing insulation structure is in fluid communication with a second primary channel of the second roofing insulation structure.

11. The roofing insulation system of claim 9, wherein the first roofing insulation structure comprises at least one first primary channel and at least one first secondary channel (318) in fluid communication with the at least one first primary channel, the second roofing insulation structure comprises at least one second primary channel and at least one second secondary channel (328) in fluid communication with the at least one second primary channel, at least one first primary channel of the first roofing insulation structure is in fluid communication with a second primary channel of the second roofing insulation structure, and at least one first secondary channel of the first roofing insulation structure is in fluid communication with a second secondary channel of the second roofing insulation structure.

* * * * *